United States Patent
Saitou et al.

(10) Patent No.: US 6,636,251 B2
(45) Date of Patent: Oct. 21, 2003

(54) IMAGE FORMING APPARATUS AND METHOD

(75) Inventors: Masanobu Saitou, Shizuoka (JP); Satoru Inami, Shizuoka (JP); Seiichi Shinohara, Shizuoka (JP); Takayuki Namiki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/157,976

(22) Filed: May 31, 2002

(65) Prior Publication Data

US 2003/0085981 A1 May 8, 2003

(30) Foreign Application Priority Data

Jun. 12, 2001 (JP) .......................... 2001-177089

(51) Int. Cl.⁷ .......................... G03G 15/04; G02B 26/10
(52) U.S. Cl. ....................... 347/131; 347/132; 347/233; 358/300
(58) Field of Search ................... 347/129, 131, 347/132, 233, 240; 358/296, 300, 3.26, 3.27

(56) References Cited

U.S. PATENT DOCUMENTS 5,402,409 A * 3/1995 Kataoka et al. ............. 358/296
5,589,870 A * 12/1996 Curry et al. ................. 347/233

FOREIGN PATENT DOCUMENTS

JP        2001-287397 A    * 10/2001

* cited by examiner

*Primary Examiner*—Joan Pendegrass
(74) *Attorney, Agent, or Firm*—Fitzpatrick, Cella, Harper & Scinto

(57) ABSTRACT

An image forming and apparatus is provided in which a halftone density of an image is stabilized irrespective of a timing at which writing on scanning lines is started, even when using multiple laser beams. First, it is determined whether or not a portion exposed by adjacent laser beams (i.e., exposed by both of two beams simultaneously) is present. If the result of the determination is affirmative, it is then determined whether or not a portion adjacent to the exposed portion and not exposed by a laser beam is present. If the result of this determination is affirmative, exposure by fine dots is added to the portion not exposed by a laser beam.

7 Claims, 14 Drawing Sheets

BEAM A
BEAM B

MAIN SCANNING DIRECTION

⊘ : BEAM IRRADIATION

◯ : BEAM NON-IRRADIATION

MAIN SCANNING DIRECTION

⊘ : BEAM IRRADIATION

◯ : BEAM NON-IRRADIATION

MAIN SCANNING DIRECTION

⊘ : BEAM IRRADIATION
○ : BEAM NON-IRRADIATION

MAIN SCANNING DIRECTION

⊘ : BEAM IRRADIATION
○ : BEAM NON-IRRADIATION

IMAGE FORMING APPARATUS AND METHOD

BACKGROUND OF THE INVENTION

1. Field of the Invention

The present invention relates to an image forming apparatus using multiple beams, and more particularly, to stabilization of the density of a formed image.

2. Description of the Related Art

In a conventional image forming apparatus using an electrophotographic method in which a visual image is formed according to charging, exposure and development, an approach has been adopted widely in which, after performing primary charging of an electrophotographic photosensitive member, which serves as an image bearing member, exposure is performed, using a semiconductor laser as means for forming an electrostatic latent image on the photosensitive member. (To be more exact, a laser chip comprising a laser diode and a photodiode sensor is used as the means for forming an electrostatic latent image.) By feeding back an output signal from the photodiode sensor to a bias power supply for the laser diode, and automatically controlling the amount of the bias current, a laser beam is stabilized.

Recently, in order to realize high-speed printing with an image forming apparatus, means for forming an electrostatic latent image using a multi-laser device has been practically used, in which a plurality of laser beams are simultaneously emitted at one main scanning operation. For example, in a multilaser method using two lasers, the above-described configuration is adopted: that is, each laser comprises a pair of a laser diode and a photodiode sensor, in order to stabilize the obtained laser beam.

Various image-signal processing techniques for improving the quality of an image are being used. For example, a method has been proposed in which, when forming an image by binary coding a digital image signal, the digital image signal is first converted into an analog signal, and a binary signal subjected to pulse-width modulation (PWM) is generated by comparing the analog signal with a periodic pattern signal, such as a triangular-wave signal. An invention in which the above-described PWM method is applied to a multibeam laser printer is disclosed in Japanese Patent Application Laid-Open (Kokai) No. 8-317157 (1996). In this invention, in order to prevent variations in the image density due to individual differences among multiple laser beams, a pattern signal for each laser is corrected by PWM. That is, each laser beam is sometimes subjected to peculiar PWM in accordance with the characteristics of the beam, so that variations in the image density are suppressed by providing a uniform light-portion potential by laser scanning, by reducing variations in the amounts of light output by the respective laser beams.

However, in a multibeam laser printer, there is the problem that the halftone image density differs even if variations in the characteristics of the laser beams are not present. This is a new problem such that the halftone image density differs if at which the position to start image writing shifts even just by one line in the sub-scanning direction. It is considered that this phenomenon is caused by nonlinearity of the curve of the amount of light E of the photosensitive member versus the potential V (E–V curve). For example, the amount of light E is expressed by E=I×t, where I is the intensity of light, and t is the exposure time. The above-described variations in the density are produced because, even if the same amount of light E is provided for the photosensitive member, the sensitivity differs and the potential may change if the intensity of light I changes or the exposure time t changes. This phenomenon is called reciprocity. With respect to reciprocity, an example in which the sensitivity increases by projecting weak light beams onto a photosensitive member a plurality of times is reported in Japanese Patent Application Laid-Open (Kokai) No. 4-51043 (1992).

An example of differences in the halftone density caused by reciprocity in multiple beams will now be illustrated. FIG. 15 is a schematic diagram illustrating a halftone image with two dots and two spaces obtained by simultaneously projecting beams A and B. A pair of laser beams are defined as beams A and B. The beam A corresponds to the first line of writing positions on paper, and the beam B corresponds to the second line. Thereafter, the beams A and B are alternately projected on odd lines and even lines, respectively. After the beams A and B simultaneously are in an on-state to scan two-dot lines at the first scanning by a polygonal mirror, the beams A and B simultaneously assume an off-state turned of at the next scanning by the polygonal mirror, to provide two spaces. A halftone image with two dots and two spaces is obtained by sequentially repeating simultaneous on-state and off-state of the beams A and B. In FIG. 15, the pairing of the laser beams is indicated by being surrounded by broken lines.

FIG. 16 is a schematic diagram illustrating a halftone image with two dots and two spaces obtained by simultaneously (sequentially) projecting the beams A and B. At the first scanning by the polygonal mirror, the beam A is in an off-state and the beam B is in an on-state, to provide a one-dot line and one space. At the next scanning by the polygonal mirror, the beam A is in an on-state and the beam B is in an off-state, to provide a one-dot line and a one-dot space. A halftone image with two dots and two spaces shifted by one line is obtained by sequentially repeating the above-described one space and one dot, and one dot and one space.

The densities of the images with two dots and two spaces shown in FIGS. 15 and 16 were compared with each other. The density of the image with two dots and two spaces shown in FIG. 15 in which the two laser beams were simultaneously projected in the main scanning direction, was 1.15. The density of the image with two dots and two spaces shown in FIG. 16 in which the laser beams were alternately projected, was 1.21. Accordingly, the density in simultaneous irradiation is lower than the density in alternate irradiation.

In order to study the reason for this difference, first, it was checked if a difference was present in the amount of light. It can be considered that the amount of light may decrease during simultaneous irradiation due to mutual influence between the laser beams caused by thermal and electrical crosstalk between the laser beams. Accordingly, the amount of light of laser beams when a pair of laser beams were simultaneously projected and the amount of light of a laser beam when a single laser beam was projected were measured and compared with each other.

FIG. 17 is a graph illustrating the value of the amount of light measured by a pin-photodiode when only the beam A performed scanning. FIG. 18 is a graph illustrating the value of the amount of light measured by the pin-photodiode when only the beam B performed scanning. FIG. 19 is a graph illustrating the value of the amount of light measured by the pin-photodiode when the beams A and B were simultaneously emitted to perform scanning. The sum of the amounts of light of the beams A and B shown in FIGS. 17 and 18, respectively, coincides with the amount of light of simultaneous emission of the beams A and B shown in FIG. 19. This result indicates that the amounts of light of multiple beams are not reduced and stable even if the two beams are simultaneously emitted.

Next, it was studied if there is a difference in the potential of the photosensitive member. Since the diameter of the used laser spot is not small, it is estimated that superposition of spots of a pair of laser beams occurs, and the potential differs at a superposed portion. Scanning was performed in the conditions that the beams A and B had the same spot diameter with the size of 70 µm both in the main scanning and sub-scanning directions. The size of one pixel of an image with a resolution of 1,200 dpi (dots per inch) was 21 µm.

FIG. 20 is a schematic diagram illustrating a state in which a light-amount distribution at simultaneous exposure is converted into a potential-distribution via an E–V curve. The amount of multibeam light obtained by superposing the beams A and B projected onto the photosensitive member is converted into a potential via the E–V curve. A noteworthy area is the portion where the spots are superposed. After synthesizing the amounts of light, the obtained multibeam light is projected onto the photosensitive member, where holes are simultaneously generated, and the potential distribution is determined. Even if the beams A and B slightly shift in the scanning direction, it, can be deemed that the beams A and B are simultaneously projected onto the photosensitive member because the time period of light projection is very short, i.e., about 1 µsec.

FIG. 21 is a schematic diagram illustrating a state in which a light-amount distribution at individual exposure is converted into a potential distribution via the E–V curve. In FIG. 21, arrows (1) indicate a path through which the first-time potential-distribution is determined as a result of generation of holes after projecting the first beam A onto the photosensitive member, and arrows (2) indicate a path through which the second-time potential-distribution is determined as a result of generation of holes after projecting the next beam B onto the photosensitive member.

By comparing FIGS. 20 and 21 with each other, the following conclusion is obtained. That is, although the total amount of light is the same at a portion where the spots are superposed, at simultaneous irradiation, strong light is projected onto the photosensitive member only once, to determine the potential. Even when individually projecting weak light twice, the potential can be sufficiently reduced because the E–V curve is downwardly-convex nonlinear, and two potential distributions are to be superposed. However, the E–V curve for changing the amount of light in each of FIGS. 20 and 21 is in the case of exposure on the entire surface, and therefore is not strictly applied to a halftone image with two dots and two spaces. Accordingly, an E–V curve obtained with two dots and two spaces was actually measured, and it was studied whether or not there is a difference between simultaneous exposure and individual exposure in a photosensitive member having a downwardly-convex nonlinear E–V curve.

FIG. 22 is a graph illustrating results of measuring the surface potential of a photosensitive member by changing the amount of light with two dots and two spaces at simultaneous and individual irradiation of the beams A and B in multibeam irradiation. The values with two dots and two spaces are shown in Table 1.

TABLE 1

| | IMAGE DENSITY | SURFACE POTENTIAL OF PHOTOSENSITIVE DRUM |
|---|---|---|
| SIMULTANEOUS IRRADIATION | 1.15 | −265V |
| INDIVIDUAL IRRADIATION | 1.21 | −250V |

The graph shown in FIG. 22 indicates that the curve of the potential versus the amount of light with two dots and two spaces at simultaneous irradiation is always higher than the curve of the potential with two dots and two spaces at individual irradiation, and therefore has a lower sensitivity. More specifically, the amount of light in the image forming apparatus was set to 3.0 mJ/m$^2$. In the case of FIG. 15 in which a pair of beams were simultaneously projected, the potential was −265 V, while in the case of FIG. 16, in which a pair of beams were individually projected, the potential was −250 V. Since reversal development is performed, the density is lower with the potential of −265 V than with the potential of −250 V. As described above, this difference between potentials causes different densities, of 1.15 and 1.21, respectively. Accordingly, in order to adjust the density at simultaneous irradiation to the density at individual irradiation, it is necessary to increase the amount of light at simultaneous irradiation to about 9/8 times, i.e., to a value of about 3.4 mJ/m$^2$.

As described above, in the case of multibeam irradiation, the potential at simultaneous irradiation of a pair of beams is higher than the potential at individual irradiation and therefore the sensitivity is lower even if the amount of light is the same, because of reciprocity. That is, at a portion where the beams are superposed, when the beams are simultaneously emitted, a photosensitive member is irradiated at a time in a state in which the amounts of light of the beams are added. On the other hand, when the beams are individually emitted, the photosensitive member is irradiated in a state in which the amount of light of each of the beams is individually supplied. At that time, although a halftone image is written in a state in which the line to start writing is shifted only by one line between the two cases, the sensitivity is lower in the former case, thereby causing a difference in the density.

SUMMARY OF THE INVENTION

The present invention has been made in consideration of the above-described problems.

It is an object of the present invention to provide an image forming apparatus and method in which a halftone density is stabilized irrespective of a timing to start writing of scanning lines even if multibeam irradiation is performed.

According to one aspect of the present invention, an image forming apparatus for forming an image by exposing a photosensitive member by causing a plurality of laser beams to perform simultaneous scanning, includes first determination means, for determining whether or not a portion exposed by adjacent laser beams with partial superposing or overlapping of the beams, simultaneously, is present, and second determination means, for determining whether or not a portion adjacent to the exposed portion and not exposed by a laser beam is present, if a result of determination by the first determination means is affirmative. Also included are control means, for adding exposure by fine dots to the unexposed portion, if a result of determination by the second determination means is affirmative.

According to another aspect of the present invention, an image forming, apparatus for forming an image by exposing a photosensitive member by causing a plurality of laser beams to perform simultaneous scanning includes first determination means for determining whether or not a portion exposed by adjacent laser beams with partial overlapping or superposing, simultaneously, and a portion exposed by adjacent laser beams with partial superposing, sequentially, are present, and second determination means, for determining whether or not a portion adjacent to the portion exposed by adjacent laser beams with partial superposing, simultaneously, and not exposed by a laser beam is present, if a result of determination by the first determination means is affirmative. Also provides are control means for adding exposure, by fine dots to the unexposed portion, if a result of determination by the second determination means is affirmative.

According to still another aspect of the present invention, an image forming apparatus includes latent-image forming means for forming a latent image by exposing a photosensitive member by performing simultaneous scanning with two laser beams in a main scanning direction. When the photosensitive member is exposed by the two laser beams at one scanning operation in the main scanning direction with partial superposing, the latent-image forming means adds exposure by fine dots at an immediately preceding or immediately succeeding scanning operation with respect to the one scanning operation in the main scanning direction.

According to yet another aspect of the present invention, an image forming apparatus includes latent-image forming means for forming a latent image by exposing a photosensitive member by performing simultaneous scanning with two laser beams. When the two laser beams perform simultaneous emission at one scanning operation in a main scanning direction, the latent-image forming means adds exposure by fine dots at an immediately preceding or immediately succeeding scanning operation with respect to the one scanning operation in the main scanning direction. When one of the two laser beams performing emission at the one scanning operation in the main scanning direction and one of the two laser beams performing emission at an immediately succeeding scanning operation in the main scanning direction are adjacent to each other, the latent-image forming means does not add exposure of fine dots.

According to yet a further aspect of the present invention, an image forming method in an image forming apparatus for forming an image by exposing a photosensitive member by causing a plurality of laser beams to perform simultaneous scanning, includes a step A, of determining whether or not a portion exposed by adjacent laser beams with partial superposing, simultaneously, is present, and a step B of determining whether or not a portion adjacent to the exposed portion and not exposed by a laser beam is present, if a result of determination in the step A is affirmative. In a step C, there is added exposure by fine dots to the unexposed portion, if a result of determination in step B is affirmative.

According to still another aspect of the present invention, an image forming method in an image forming apparatus for forming an image by exposing a photosensitive member by causing a plurality of laser beams to perform simultaneous scanning, includes a step A, of determining whether or not a portion exposed by adjacent laser beams with partial superposing, simultaneously, and a portion exposed by adjacent laser beams with partial superposing, sequentially, are present, and a step B, of determining whether or not a portion adjacent to the portion exposed by, adjacent laser beams with partial superposing, simultaneously, and not exposed by a laser beam is present, if a result of determination in the step A is affirmative. In a step C, exposure by fine dots is added to the unexposed portion, if a result of determination in step B is affirmative.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Preferred embodiments of the present invention will now be described in detail illustrating a laser printer. The present invention may be applied not only to an apparatus, but also to a method which conforms to the following description of these embodiments.

First Embodiment

Figure 4:
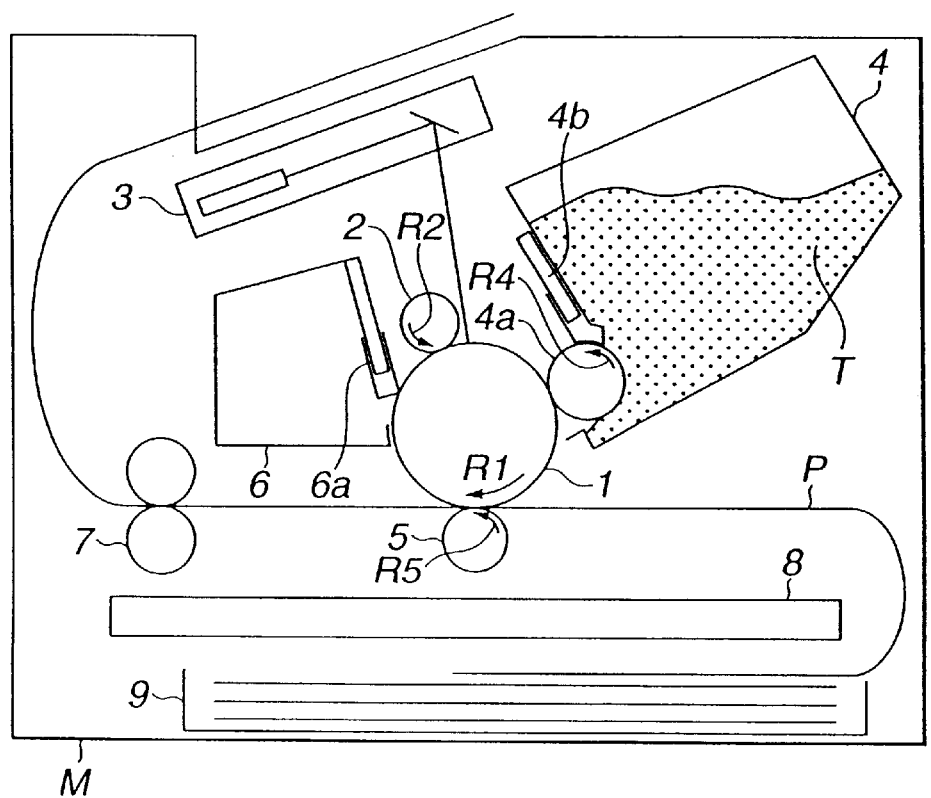
FIG. 4 is a schematic cross-sectional view illustrating the configuration of the first embodiment.

FIG. 4 is a schematic cross-sectional view illustrating the configuration of a "laser printer" according to a first embodiment of the present invention. In FIG. 4, there is shown a printer main body M. A photosensitive drum 1 comprises a tubular electrophotographic photosensitive member, and is rotatably driven in the direction of an arrow R1 by driving means (not shown). The surface of the photosensitive drum 1 is uniformly charged by a charging member 2 rotating in the direction of an arrow R2 while contacting the photosensitive drum 1. Then, an electrostatic latent image is formed on the surface of the photosensitive drum 1 by a latent-image forming unit 3. A developing unit 4 includes a hopper, serving as a toner accommodating unit, for stocking a toner T, and a developing sleeve 4a, serving as a toner carrying member, and develops the electrostatic latent image formed on the photosensitive drum 1. A developing sleeve 4b, serving as a toner regulating member, is provided in the vicinity of the developing sleeve 4a rotating in the direction of an arrow R4. A developing bias voltage obtained by superposing an AC bias voltage on a DC bias voltage is supplied between the photosensitive drum 1 and the developing sleeve 4a, from an engine control unit 8 including a power supply for driving the laser printer, and a high-voltage circuit for supplying a bias voltage for image formation. The electrostatic latent image on the photosensitive drum 1 is developed by the toner T supplied thereto as a toner image. The toner image on the photosensitive drum 1 is transferred onto a transfer material P, such as paper, by a transfer unit 5 rotating in the direction of an arrow R5. Sheets of the transfer material P are accommodated in a sheet feeding cassette 9. Each sheet of the transfer material P is fed by a sheet feeding roller (not shown), and is further conveyed to a transfer nip portion between the photosensitive drum 1 and the transfer unit 5. The toner image transferred on the transfer material P is conveyed to a fixing unit 7 together with the transfer material P, and is fixed on the transfer material P by being heated and pressed, to become a recorded image. On the other hand, toner particles remaining on the photosensitive drum 1 without being transferred onto the transfer material P. (hereinafter termed "toner particles remaining after image transfer") are removed by a cleaning blade 6a within a cleaning unit 6. The photosensitive drum 1 from the surface of which toner particles remaining after image transfer have been removed is subjected to the next image forming operation starting from charging by the charging member 2, and the above described series of image forming processes are repeated.

Figure 3:
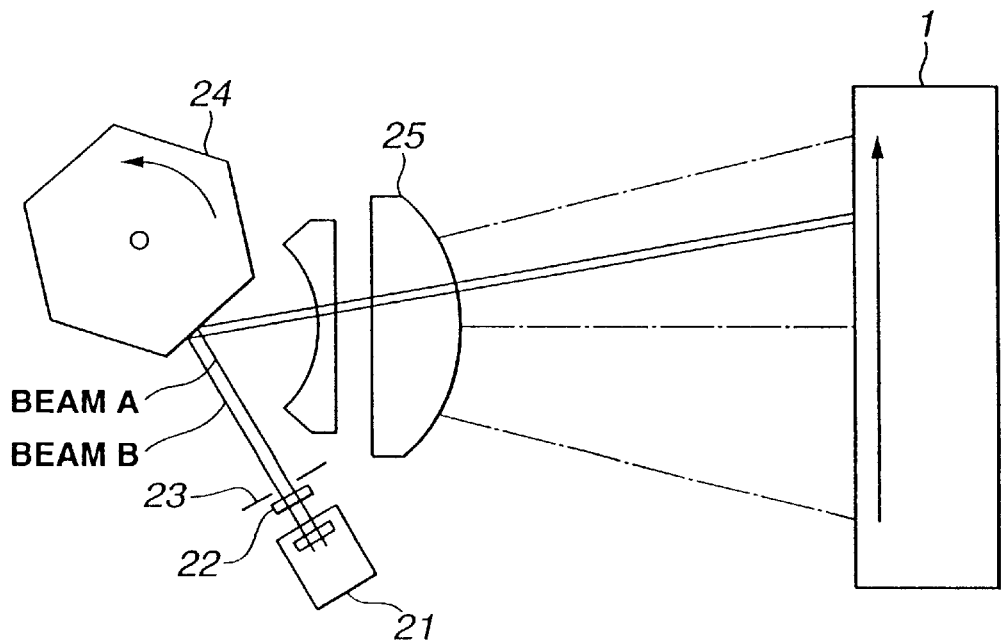
FIG. 3 is a diagram illustrating the details of a latent-image forming unit.

FIG. 3 is a diagram illustrating the details of the latent-image forming unit 3 in the laser printer of the first embodiment. In FIG. 3, a laser beam emitted from a semiconductor laser 21 is made a substantially parallel beam by a collimating lens 22 and a diaphragm 23, and is then incident upon a rotating polygonal mirror 24 with a predetermined beam diameter. The rotating polygonal mirror 24 rotates at a constant angular velocity in the direction of an arrow. According to this rotation, the incident laser beam is reflected as a deflected beam whose angle continuously changes. The laser beam that has become the deflected beam is condensed by an f-θ lens 25. The f-θ lens 25 also corrects distortion aberration so as to compensate temporal linearity of scanning. The laser beam performs scanning on the photosensitive member 1 at a constant velocity in the direction of an arrow (this scanning is termed main scanning), and an electrostatic latent image is formed by on/off of the laser beam.

The semiconductor laser 21 used in the first embodiment is a chip including two laser diodes, so that latent image formation on two lines can be performed at one main scanning operation. Laser beams from this pair of laser diodes are defined as beams A and B. The beams A and B have the same spot diameter, i.e., a size of 70 μm both in the main scanning direction and the sub-scanning direction. In the printer having a resolution of 1,200 dpi, the size of one pixel is 21 μm. The beam A corresponds to the leading position, i.e., the first line of writing positions on paper, and the beam A corresponds to the second line. The leading position of writing positions indicates the leading position of a region where an image can be printed. Even in the cases of a blank, the leading line does not change. Thereafter, since the beams A and B are alternately provided, the beam A corresponds to odd lines, and the beam B corresponds to even lines.

Next, a description will be provided of a method and a circuit for adding fine pixels by the semiconductor laser 21 in order to form halftone lines having a uniform density.

Figure 1:
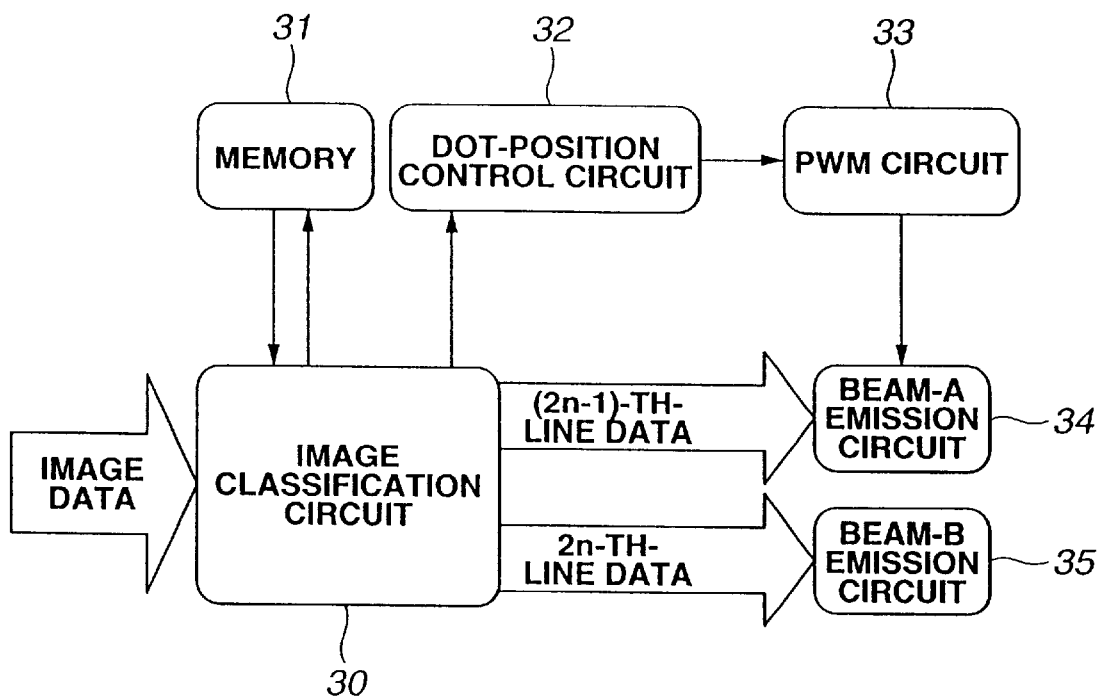
FIG. 1 is a block diagram illustrating the configuration of a circuit for controlling the pulse width of a semiconductor laser, according to a first embodiment of the present invention.

FIG. 1 is a block diagram illustrating a circuit for controlling the pulse width of the semiconductor laser 21. The pulse-width control circuit includes an image classification circuit 30 for classifying odd lines and even lines of image data, a memory 31 for storing emission positions in the main scanning direction, a dot-position control circuit 32 for generating a fine-dot signal, a PWM circuit 33 for generating a triangular-wave signal based on fine-dot-position signal, and a beam-A emission circuit 34 and a beam-B emission circuit 35, each for controlling emission of the corresponding beam of the semiconductor laser 21.

In the pulse-width control circuit having the above-described configuration, the image classification circuit 30 determines image data in which adjacent main-scanning data are present, and a pair of beams are simultaneously emitted. The image classification circuit 30 first classifies respective pairs of main-scanning data into odd lines for the beam A and even lines for the beam B. If data of the beams A and B are present at the same scanning operation, the emission position in the main scanning direction is stored in the memory 31. Conventionally, if data of the beam A is absent at the next scanning operation, the beam A is not emitted. In the first embodiment, however, at the stored position (the position of simultaneous emission at the preceding scanning operation), the dot-position control circuit 32 transmits a signal to the beam-A emission circuit 34 even if data is absent, in order to emit fine dots. That is, the operation timing of the dot-position control circuit 32 corresponds to the beam A at the next scanning operation corresponding to a position where emission of the beam A coincides with emission of the beam B, in which data is absent for the beam A. At that time, a dot-position signal is transmitted to the PWM circuit 33. The PWM circuit 33 generates a triangular-wave signal synchronized with a reference clock signal based on the dot-position signal, and transmits the generated signal to the beam-A emission circuit 34. According to modulation with the triangular-wave signal, the beam-A emission circuit 34 emits fine dots whose size is 1/4 of one pixel of the beam A, in order to increase the halftone density.

Figure 2:
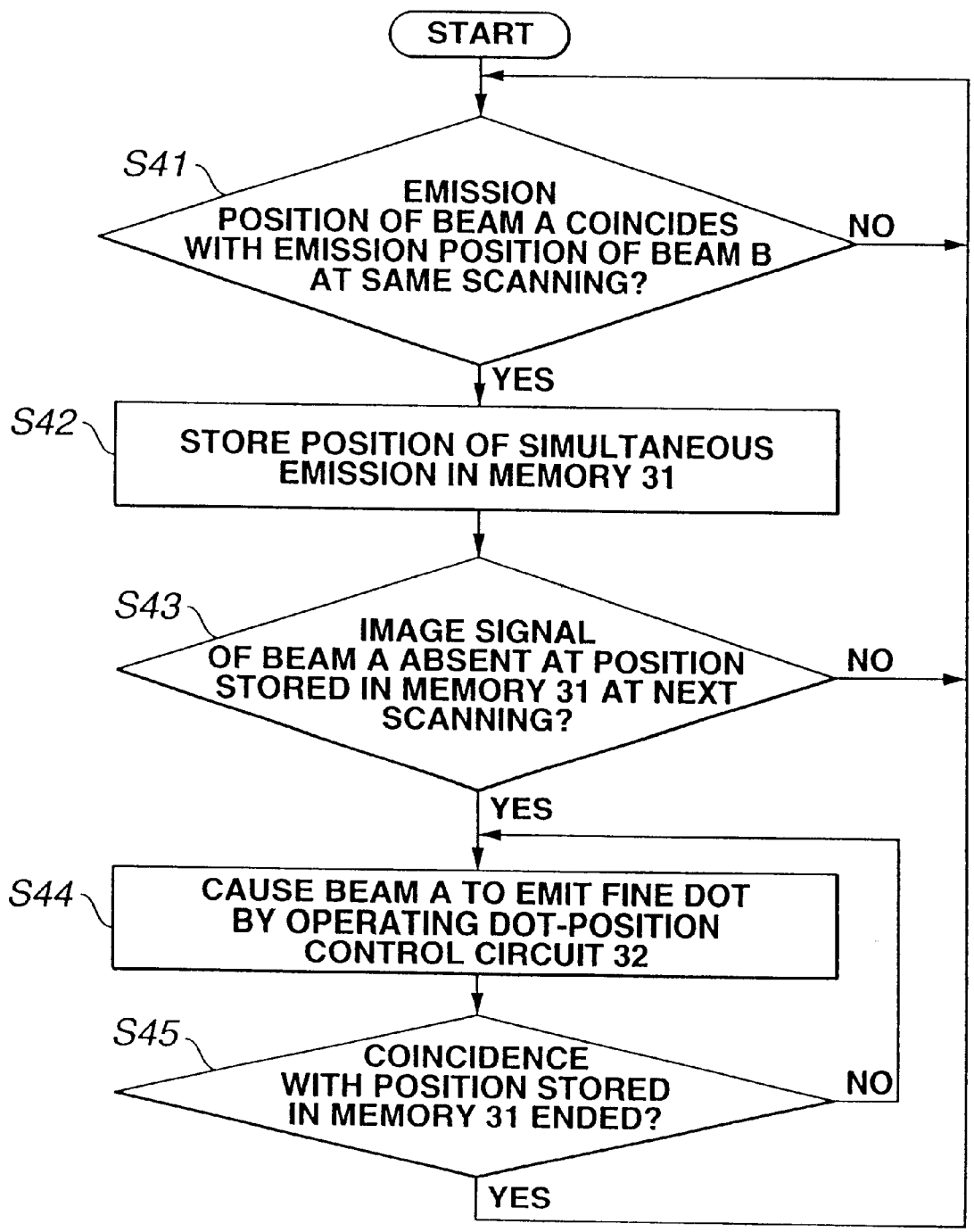
FIG. 2 is a flowchart illustrating the processing of an image classification circuit shown in FIG. 1.

FIG. 2 is a flowchart illustrating processing for classifying data of an image by the image classification circuit 30. A pair of main-scanning data are classified into odd lines (scanned by the beam A) and even lines (scanned by the beam B). The adjacent (2n−1)-th line and 2n-th line (n=1,2,3, - - - ) are subjected to the same scanning operation. It is determined whether not the position of the (2n−1)-th line coincides with the position of the 2n-th line in the scanning direction (step S41). If the result of the determination in step S41 is affirmative, the process proceeds to step S42, where the position of emission in the main scanning direction is stored in the memory 31. If the result of the determination in step S41 is negative, the process returns to the start, where the next image data is awaited. Then, it is determined whether or not data of the beam A for the (2n+1)-th line is absent in the emission position stored in the memory 31 (step S43). If the result of the determination in step S43 is affirmative, the process proceeds to step S44, where the image classification circuit 30 operates the dot-position control circuit 32 to cause the beam A to emit fine dots whose size is 1/4 of one pixel. If the result of the determination in step S43 is negative, the process returns to the start, where the next image data is awaited, since it is unnecessary to emit fine dots because the beam A is emitted by data. The same processing is repeated until the position of simultaneous emission expires (step S45).

Figure 5:
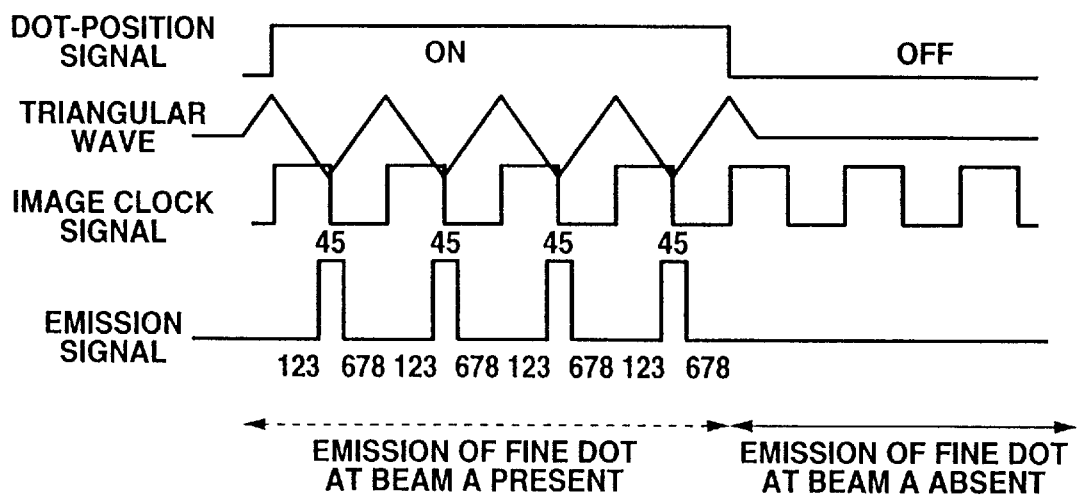
FIG. 5 is a time chart corresponding to presence/absence of a dot-position signal.

FIG. 5 illustrates a time chart when the dot-position signal is present (ON) and is absent (OFF).

At the left-half portion of the time chart, the beam-A emission circuit 34 adds fine dots whose size is 1/4 of one pixel by modulating the beam A by providing the dot-position signal in order to increase the halftone density. The memory 31 within the image classification circuit 30 stores the position of simultaneous emission of the beams A and B in the main scanning direction, immediately preceding the beam A emitting fine dots. Based on this position data, a pulse-generation-position signal is transmitted from the image classification circuit 30 to the PWM circuit 33 via the dot-position control circuit 32. The PWM circuit 33 generates a triangular-wave signal synchronized with a reference clock signal based on the pulse-generation-position signal. If an image signal is present in advance in the beam A, priority is given to the image signal over fine dots, so that the pulse-generation-position signal is not transmitted.

In the beam-A emission circuit 34, a pixel clock signal, serving as a reference signal, the triangular-wave signal from the PWM circuit 33, and an emission signal from the beam-A emission circuit 34 that is modulated by the triangular-wave signal are synchronized, and an emission signal modulated to the width of fine dots is obtained. As shown in FIG. 5, in the emission signal, when the period of an image clock signal corresponding to one pixel is divided into eight portions, the fourth and fifth positions from the leading position receive emission, and the remaining first through third, and sixth through eighth positions do not receive emission.

The right-half portion of the time chart corresponds to a case in which the dot-position signal is absent (OFF) in the beam-A emission circuit 34. In this portion, the beam A is not modulated in the beam-A emission circuit 34 because the dot-position signal is OFF, so that fine dots are not generated. The corresponding position is not stored in the memory 31 within the image classification circuit 30, and the beams A and B in the main scanning direction immediately preceding the beam A are not subjected to simultaneous emission.

Figure 6:
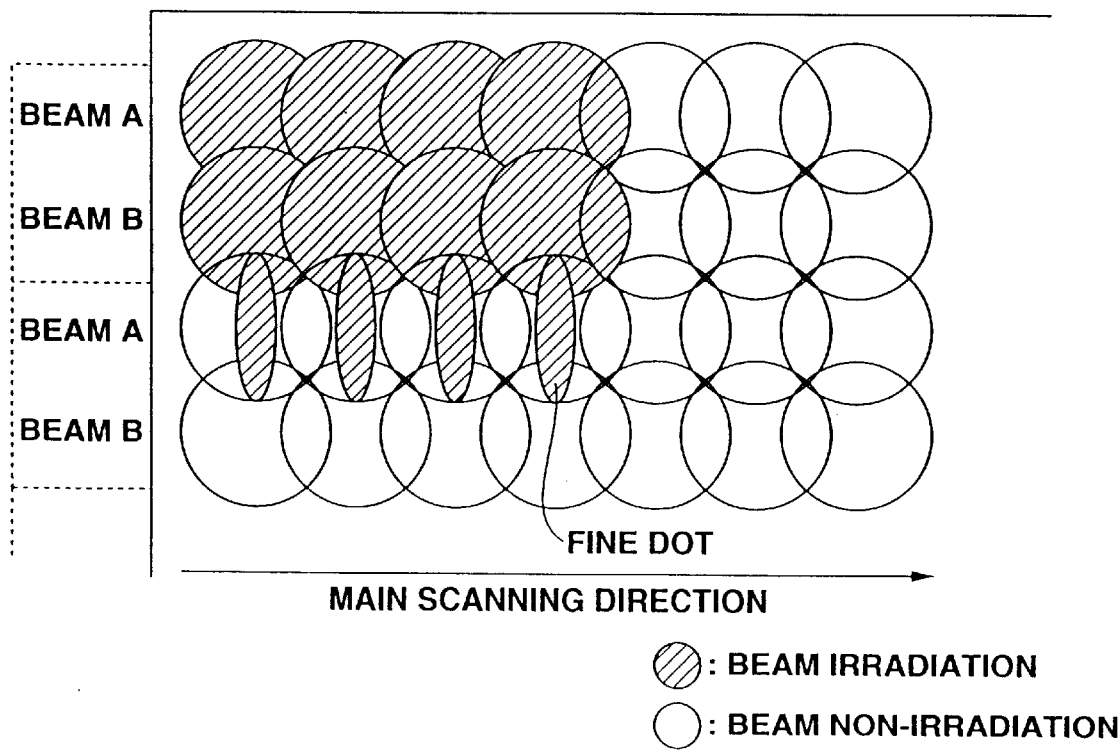
FIG. 6 is a schematic diagram illustrating an emission pattern corresponding to the time chart shown in FIG. 5.

Next, an emission pattern corresponding to the time chart shown in FIG. 5 will be described with reference to FIG. 6. At the left-half side of FIG. 6, fine dots are additionally emitted by the dot-position signal after simultaneous irradiation of the beams A and B. The time period of emission of the fine dots corresponds to 1/4 of a pixel, as shown in lower portions adjacent to dots by the beam B. At the right-half side of FIG. 6, fine dots are not emitted because the immediately preceding beams A and B are not emitted.

Figure 7:
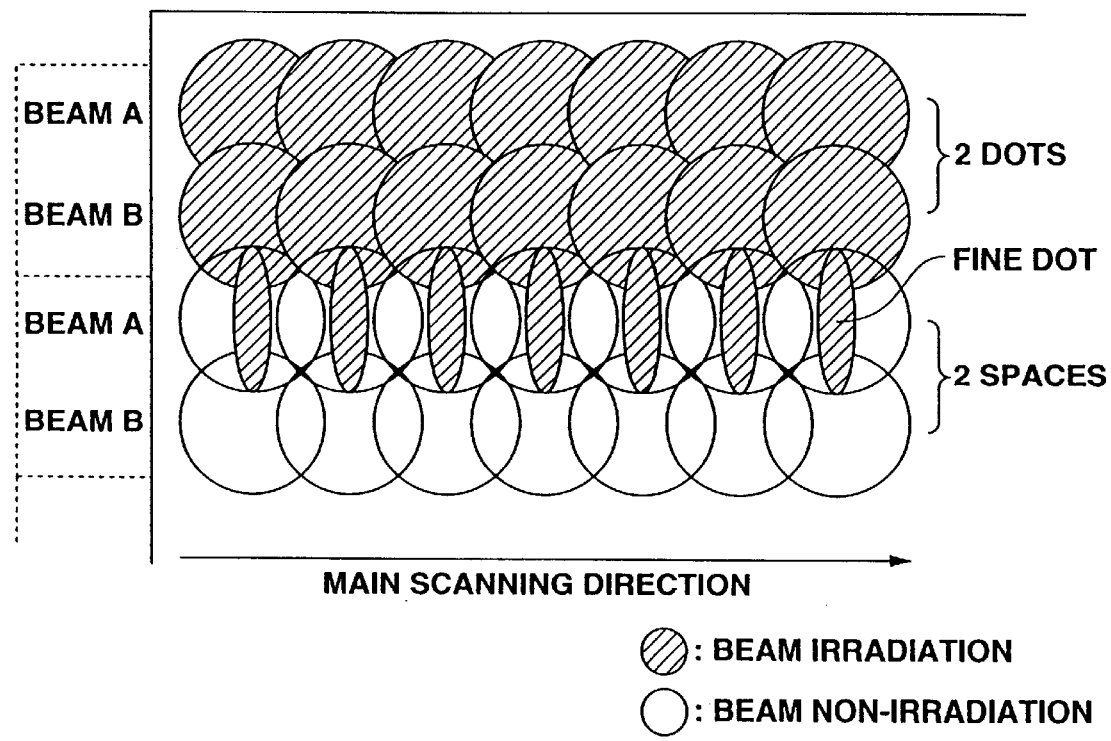
FIG. 7 is a schematic diagram illustrating addition of simultaneously projected fine dots.

FIG. 7 is a part of a schematic diagram in the case of two dots and two spaces when the beams A and B are simultaneously projected. The main scanning line moves from the left to the right, and the preceding pair of the beams A and B are adjacent to each other at a pair of scanning operations. Fine dots by the beam A of the next pair are emitted at a ratio of 1/4. Hence, the total emission time period of the laser increases by 1/8 from the case of two dots and two spaces on two preceding lines. This value is obtained by the necessity to increase the amount of light from 3.0 mJ/m$^2$ to 3.4 mJ/m$^2$ in order to be adjusted to the density at individual irradiation, and the amount of light at simultaneous irradiation becomes about 9/8 of the value at individual irradiation.

Figure 8:
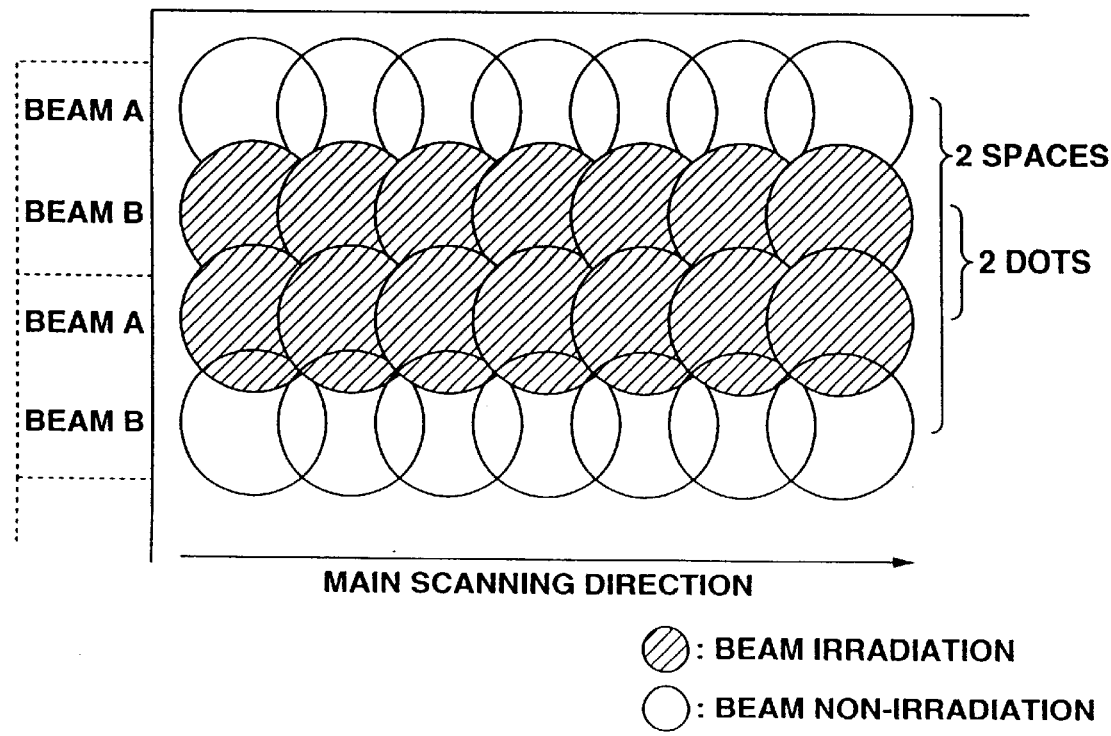
FIG. 8 is a schematic diagram illustrating individual irradiation.

FIG. 8 is a part of a schematic diagram in the case of two dots and two spaces when the beam B and the subsequent beam A are individually projected. The lines by the beams A and B are fully emitted with 8/8. In this case, since the beams A and B are individually emitted, the dot-position control circuit 32 is not operated, and fine dots are not added.

Figure 9:
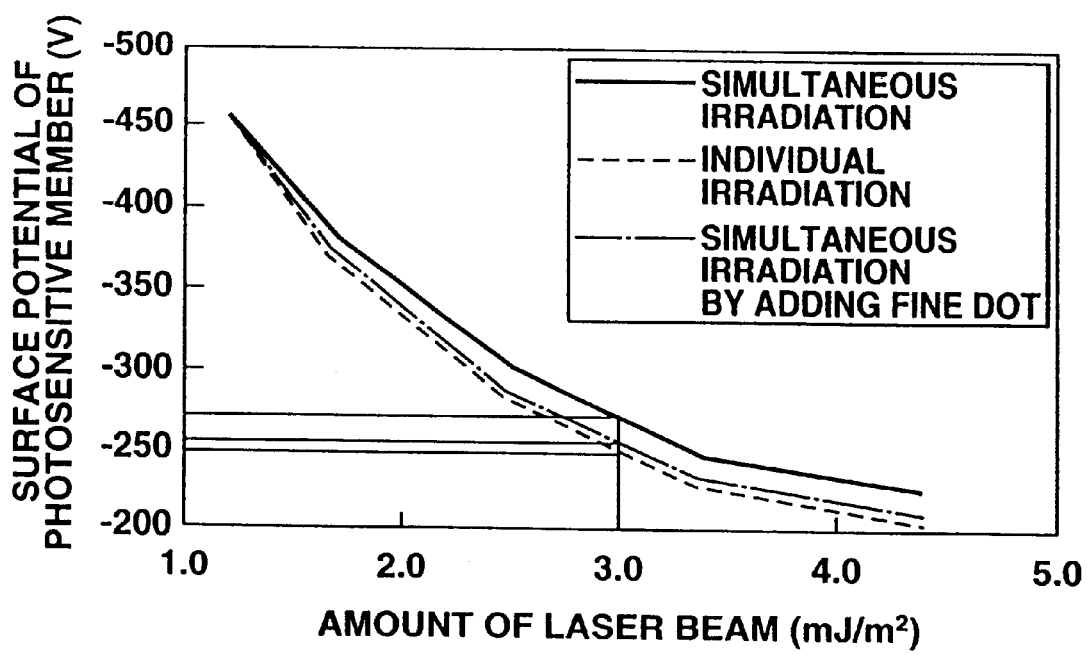
FIG. 9 is a graph illustrating the effect of addition of fine dots.

FIG. 9 is a graph illustrating results of measuring the surface potential of the photosensitive member by changing the amount of light in the case of two dots and two spaces by simultaneous irradiation and individual irradiation of the beams A and B. In order to confirm the effect by simultaneously emitted fine dots, the surface potential of the photosensitive member was measured by changing the amount of light. The density of a halftone image with repetition of two dots and two spaces with a resolution of 1,200 dpi and the potential of a latent image on the photosensitive member were measured. Table 2 shows the results of the measurement.

TABLE 2

| | IMAGE DENSITY | SURFACE POTENTIAL OF PHOTOSENSITIVE DRUM |
|---|---|---|
| SIMULTANEOUS IRRADIATION BY ADDING FINE DOT | 1.21 | −250V |
| SIMULTANEOUS IRRADIATION | 1.15 | −265V |
| INDIVIDUAL IRRADIATION | 1.21 | −250V |

FIG. 9 illustrates the case of two dots and two spaces with simultaneous irradiation of the beams A and B, the case of two dots and two spaces with simultaneous irradiation of the beams A and B and addition of fine dots, and the case of two dots and two spaces with individual irradiation of the beams A and B. This graph indicates that the curve of the potential versus the amount of light with two dots and two spaces is inferior to the curve in the case of addition of fine dots, which substantially coincides with the curve of the potential in the case of two dots and two spaces with individual irradiation. The density in the case of two dots and two spaces with simultaneously irradiation and addition of fine dots was 1.21, and the density in the case of two dots and two spaces with individual irradiation was also 1.21. Thus, the same density can be obtained by the effect of fine dots.

As described above, in the case of multibeam irradiation, the problem that the potential at simultaneous exposure of a pair of beams is higher than the potential at individual exposure, resulting in a lower sensitivity, can be solved by providing the same potential as in the case of individual exposure by adding fine dots at the next pair of scanning lines. Since the potential is the same, the same density can be obtained.

Problems in the obtained image, such as trailing of edges, and the like, caused by addition of fine dots, were not observed. The size of one pixel with the resolution of 1,200 dpi is 21 $\mu$m, and the size of the fine dot shown in FIG. 7 is 5 $\mu$m. Since the spot diameter in the main scanning direction is 70 $\mu$m, 5 $\mu$m is sufficiently smaller than the spot diameter. Accordingly, a trailed image is not obtained in consideration of overlap of latent images. When the latent image was actually developed with a toner having a particle diameter of 7 $\mu$m, an image having trailed lines was not obtained.

Second Embodiment

In a second embodiment of the present invention, fine dots are added in a preceding line at simultaneous irradiation of a pair of laser beams. According to this configuration, a halftone latent image can be corrected without disturbing the obtained image even in an apparatus in which trailing of an image by development tends to occur. In the second embodiment, the same components as in the first embodiment are indicated by the same symbols.

Figure 10:
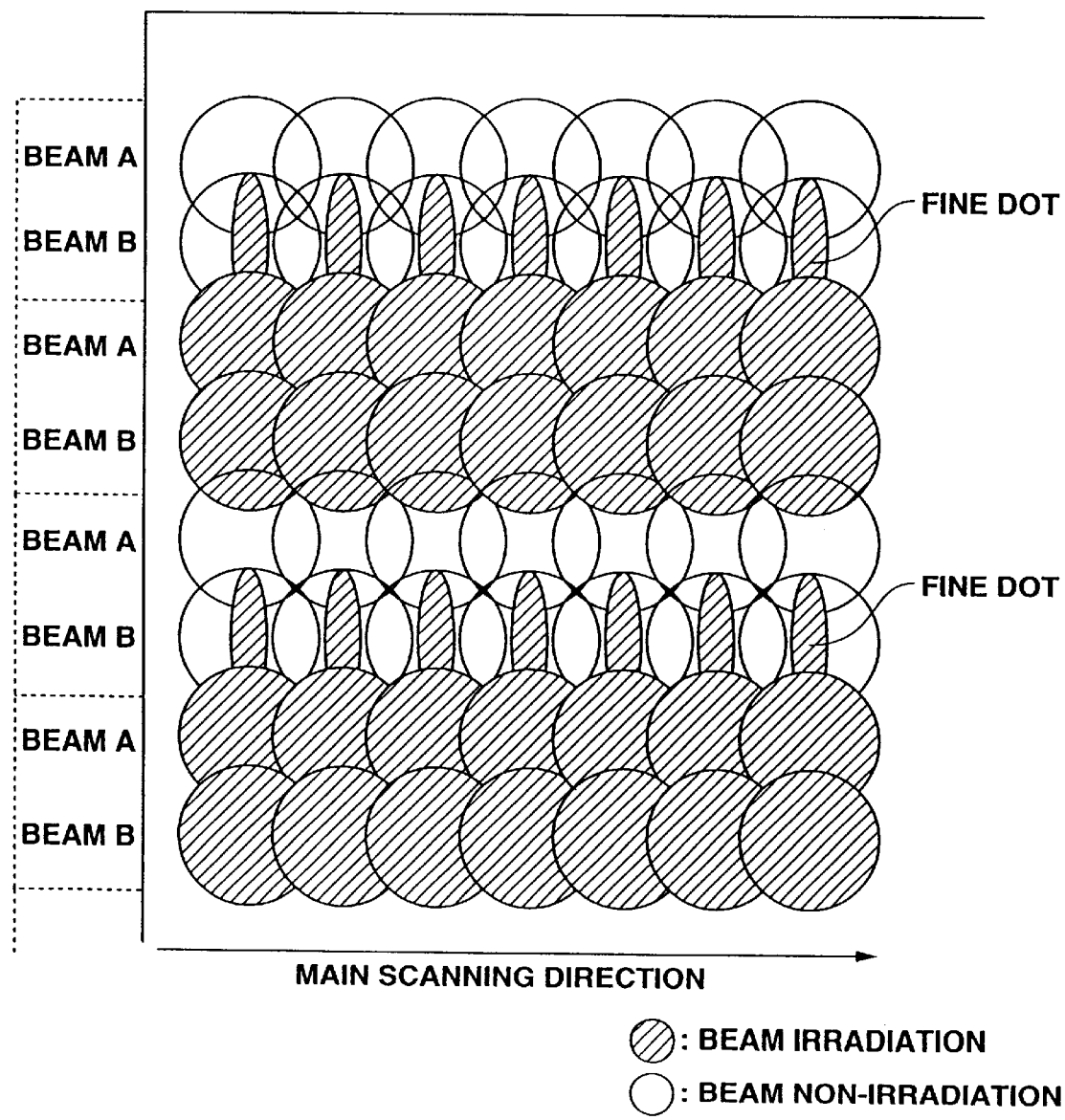
FIG. 10 is a schematic diagram illustrating addition of simultaneously projected fine dots at preceding positions in a second embodiment of the present invention.

FIG. 10 is a part of a schematic diagram in the case of two dots and two spaces when the beams A and B are simultaneously projected in the second embodiment, as modified from FIG. 7. The main scanning line moves from the left to the right, and the beams A and B are adjacent to each other. Fine dots by the beam B of the preceding pair are emitted at a ratio of 1/4. Hence, the total emission time period of the laser increases by 1/8 from the case of two dots and two spaces. The potential of the latent image was corrected to −250 V by addition of fine dots at the preceding line. That is, the same effect of potential correction as in the first embodiment in which fine dots are added in the succeeding line was obtained.

Third Embodiment

In a third embodiment of the present invention, two fine dots are added to each dot at simultaneous irradiation of a pair of laser beams.

Figure 11:
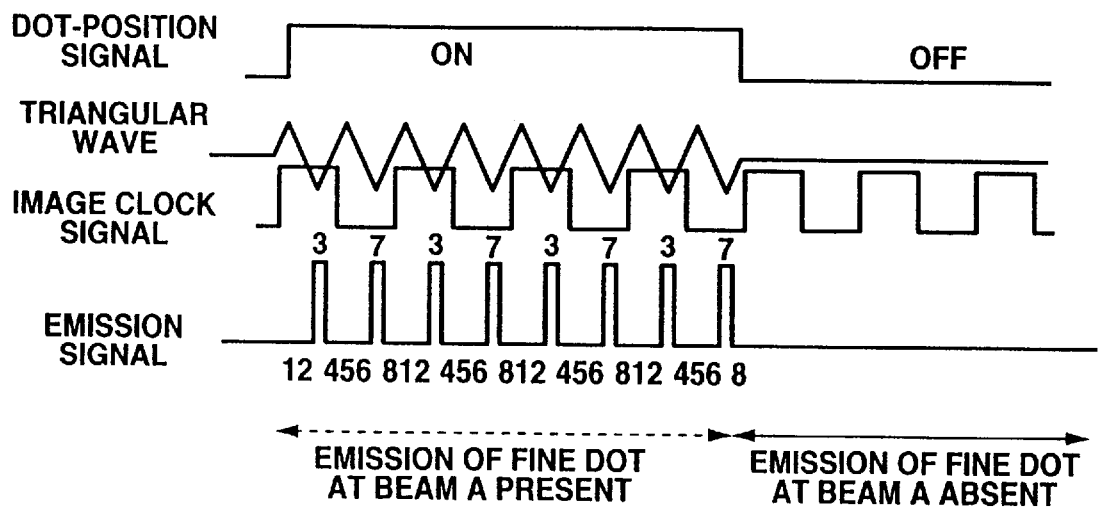
FIG. 11 is a time chart corresponding to presence/absence of a dot-position signal in a third embodiment of the present invention.

FIG. 11 illustrates a time chart when the dot-position signal is present (ON) and is absent (OFF). At the left-half portion of the time chart, the beam-A emission circuit 34 adds sets of two fine dots whose size is 1/8 of one pixel by modulating the beam A by providing the dot-position signal in order to increase the halftone density. The memory 31 within the image classification circuit 30 stores the position of simultaneous emission of the beams A and B in the main scanning direction, immediately preceding the beam A emitting fine dots. Based on this position data, a pulse-generation-position signal is transmitted from the image classification circuit 30 to the PWM circuit 33 via the dot-position control circuit 32. The PWM circuit 33 generates a triangular-wave signal synchronized with a reference clock signal based on the pulse-generation-position signal. If an image signal is present in advance in the beam A, priority is given to the image signal over fine dots, so that the pulse-generation-position signal is not transmitted.

In the beam-A emission circuit 34, a pixel clock signal, serving as a reference signal, the triangular-wave signal from the PWM circuit 33, and an emission signal from the beam-A emission circuit 34 that is modulated by the triangular-wave signal are synchronized, and an emission signal modulated to the width of fine dots is obtained. As shown in FIG. 11, in the emission signal, when the period of an image clock signal corresponding to one pixel is divided into eight portions, the third and seventh positions from the leading position receive emission, and the remaining first and second, fourth through sixth, and eighth positions do not receive emission.

The right-half portion of the time chart corresponds to a case in which the dot-position signal is absent (OFF) in the beam-A emission circuit 34. In this portion, the beam A is not modulated in the beam-A emission circuit 34 because the dot-position signal is OFF, so that fine dots are not generated. The corresponding position is not stored in the memory 31 within the image classification circuit 30, and the beams A and B in the main scanning direction immediately preceding the beam A are not subjected to simultaneous emission.

Figure 12:
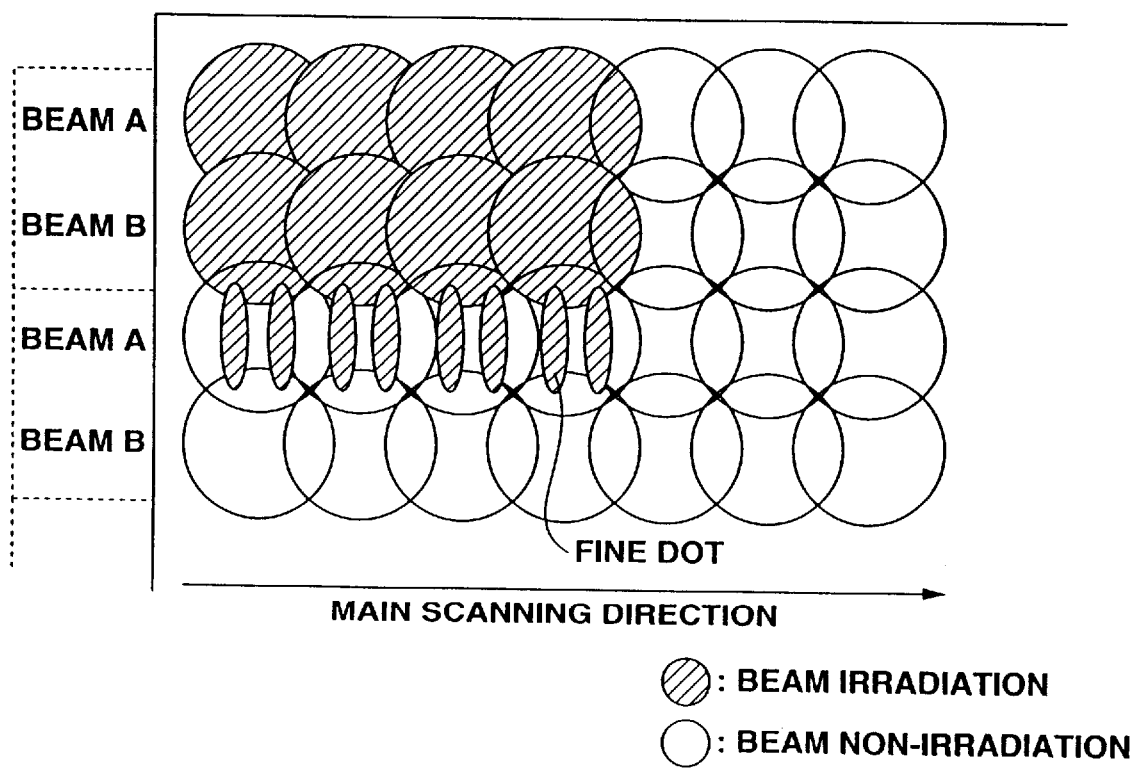
FIG. 12 is a schematic diagram illustrating an emission pattern corresponding to the time chart shown in FIG. 11.

Next, an emission pattern corresponding to the time chart shown in FIG. 11 will be described with reference to FIG. 12. At the left-half side of FIG. 12, fine dots are additionally emitted by the dot-position signal after simultaneous irradiation of the beams A and B. The time period of emission of two fine dots corresponds to 1/8 of a pixel, as shown in lower portions adjacent to dots by the beam B. At the right-half side of FIG. 12, fine dots are not emitted because the immediately preceding beams A and B are not emitted.

Figure 13:
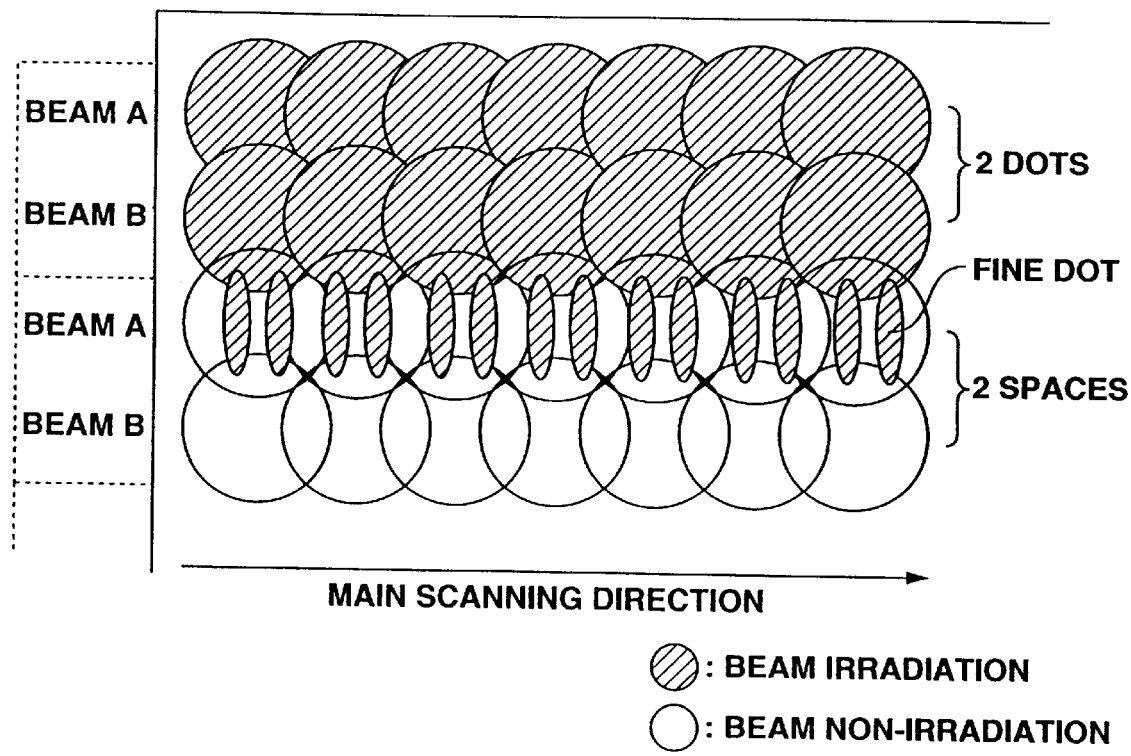
FIG. 13 is a schematic diagram illustrating addition of simultaneously projected fine dots.

FIG. 13 is a part of a schematic diagram in the case of two dots and two spaces when the beams A and B are simultaneously projected. The main scanning line moves from the left to the right, and the preceding pair of the beams A and B are adjacent to each other at a pair of scanning operations. Two fine dots by the beam A of the next pair are emitted at a ratio of 1/8 of a pixel. Hence, the total emission time period of the laser increases by 1/8 from the case of two dots and two spaces on two preceding lines. This value is obtained by the necessity to increase the amount of light from 3.0 mJ/m$^2$ to 3.4 mJ/m$^2$ in order to be adjusted to the density at individual irradiation, and the amount of light at simultaneous irradiation becomes about 9/8 of the value at individual irradiation.

Figure 14:
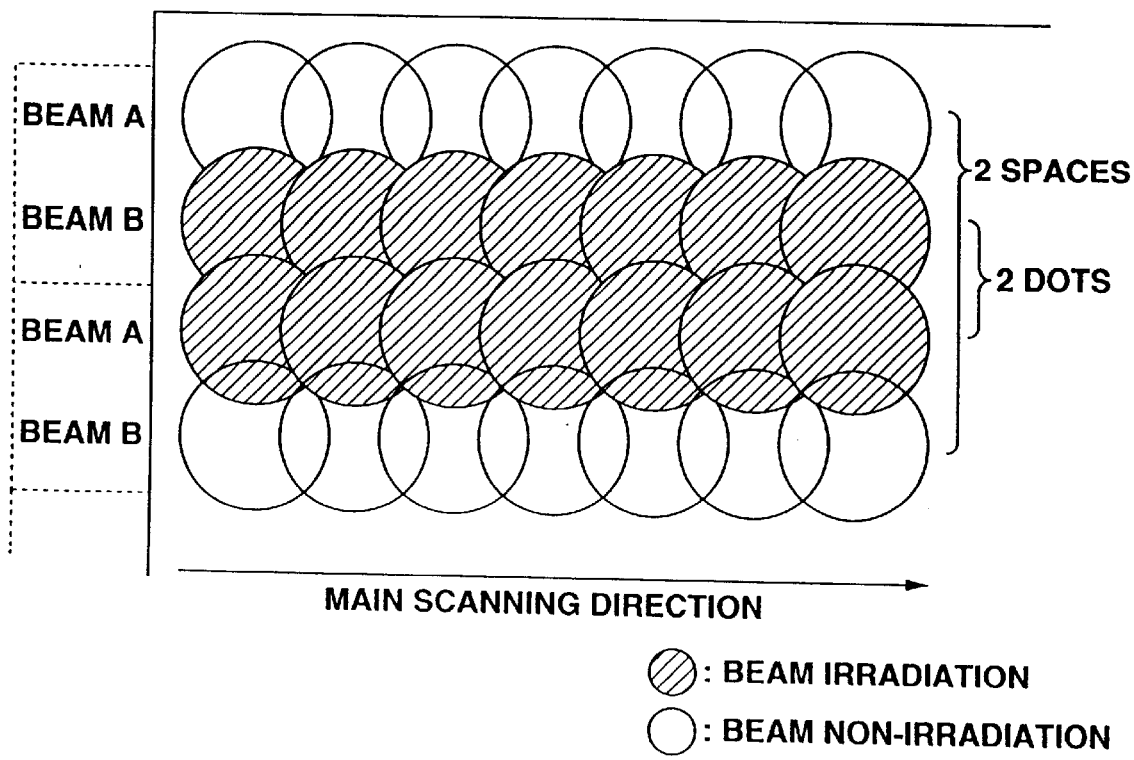
FIG. 14 is a schematic diagram illustrating individual irradiation.
Figure 15:
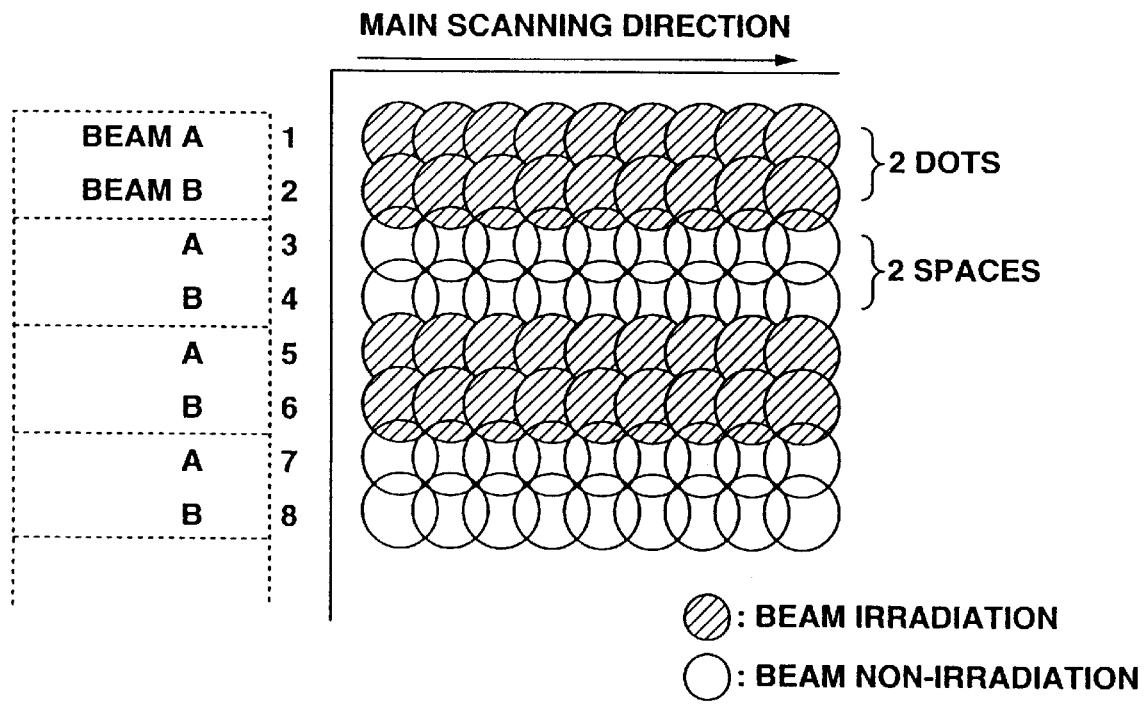
FIG. 15 is a schematic diagram illustrating simultaneous irradiation in a conventional approach.
Figure 16:
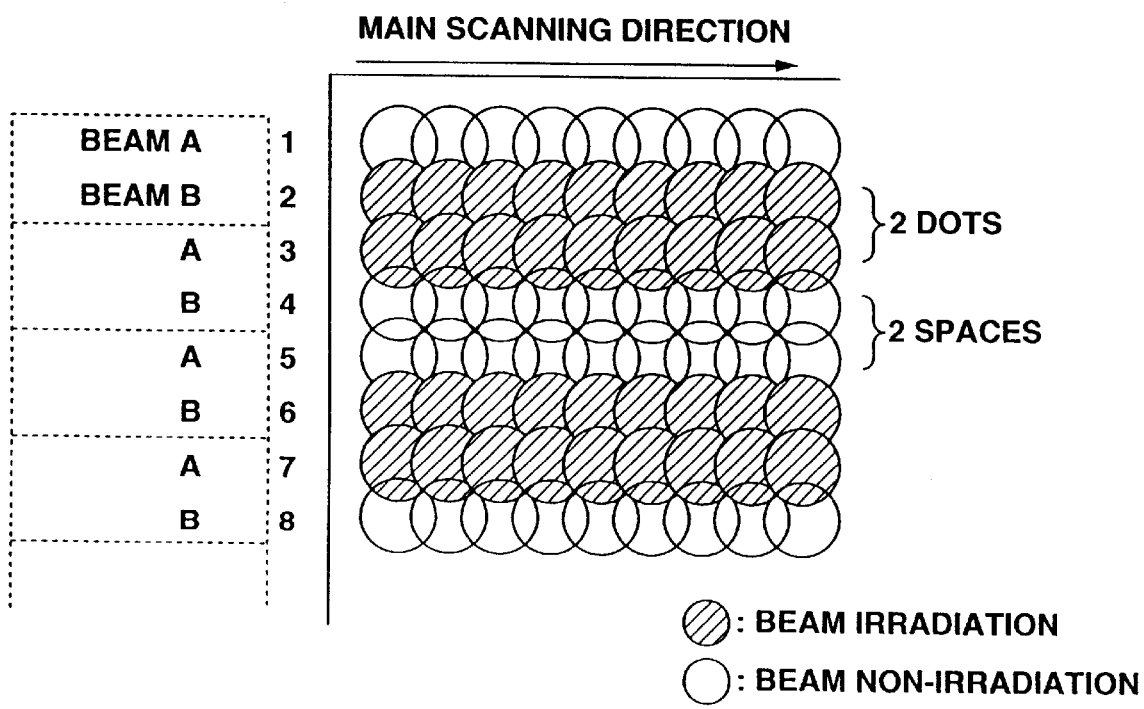
FIG. 16 is a schematic diagram illustrating individual irradiation in the conventional approach.
Figure 17:
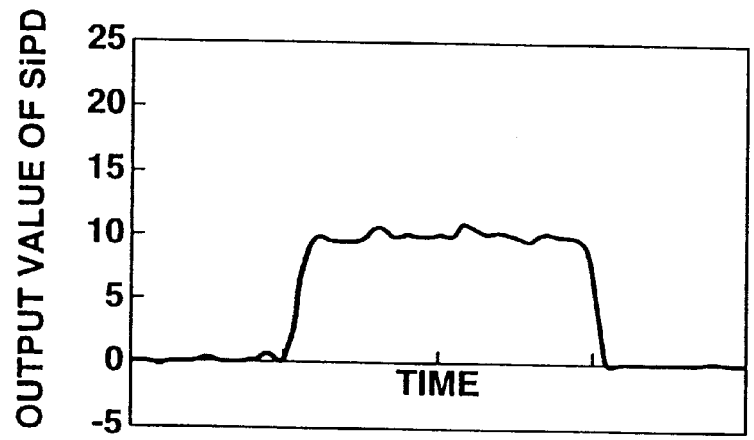
FIG. 17 is a graph illustrating the measured value of an amount of light when performing scanning with a single beam A.
Figure 18:
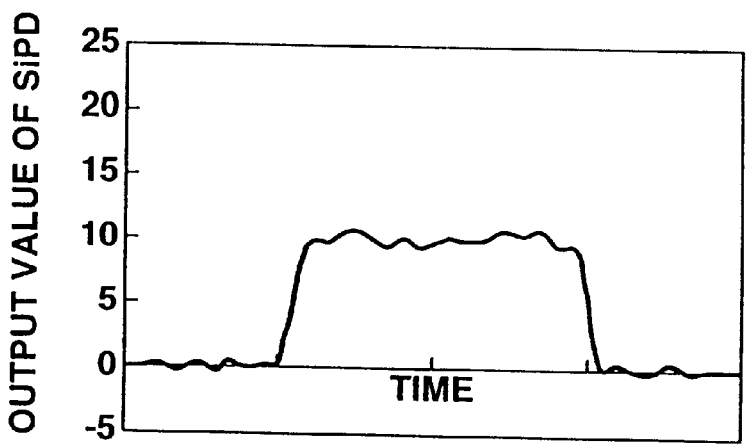
FIG. 18 is a graph illustrating the measured value of an amount of light when performing scanning with a single beam B.
Figure 19:
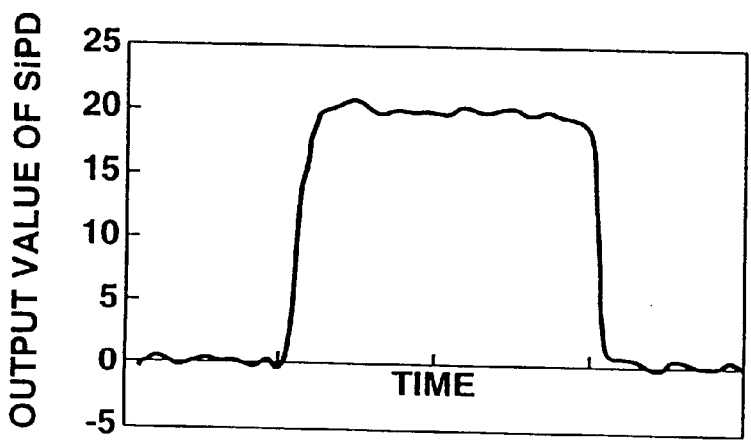
FIG. 19 is a graph illustrating the measured value of an amount of light when performing simultaneous scanning by the beams A and B.
Figure 20:
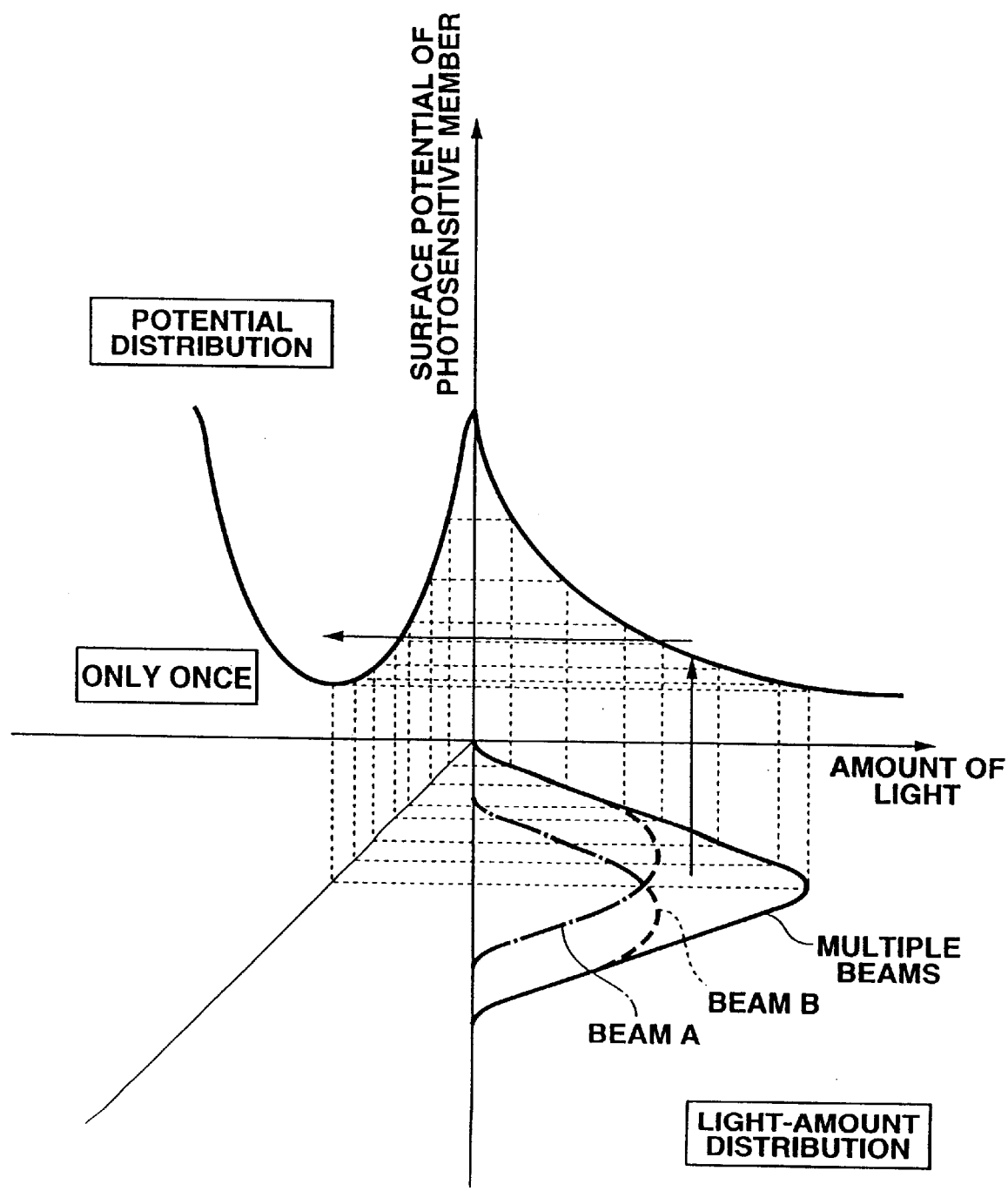
FIG. 20 is a schematic graph illustrating a potential-distribution when performing simultaneous scanning by the beams A and B.
Figure 21:
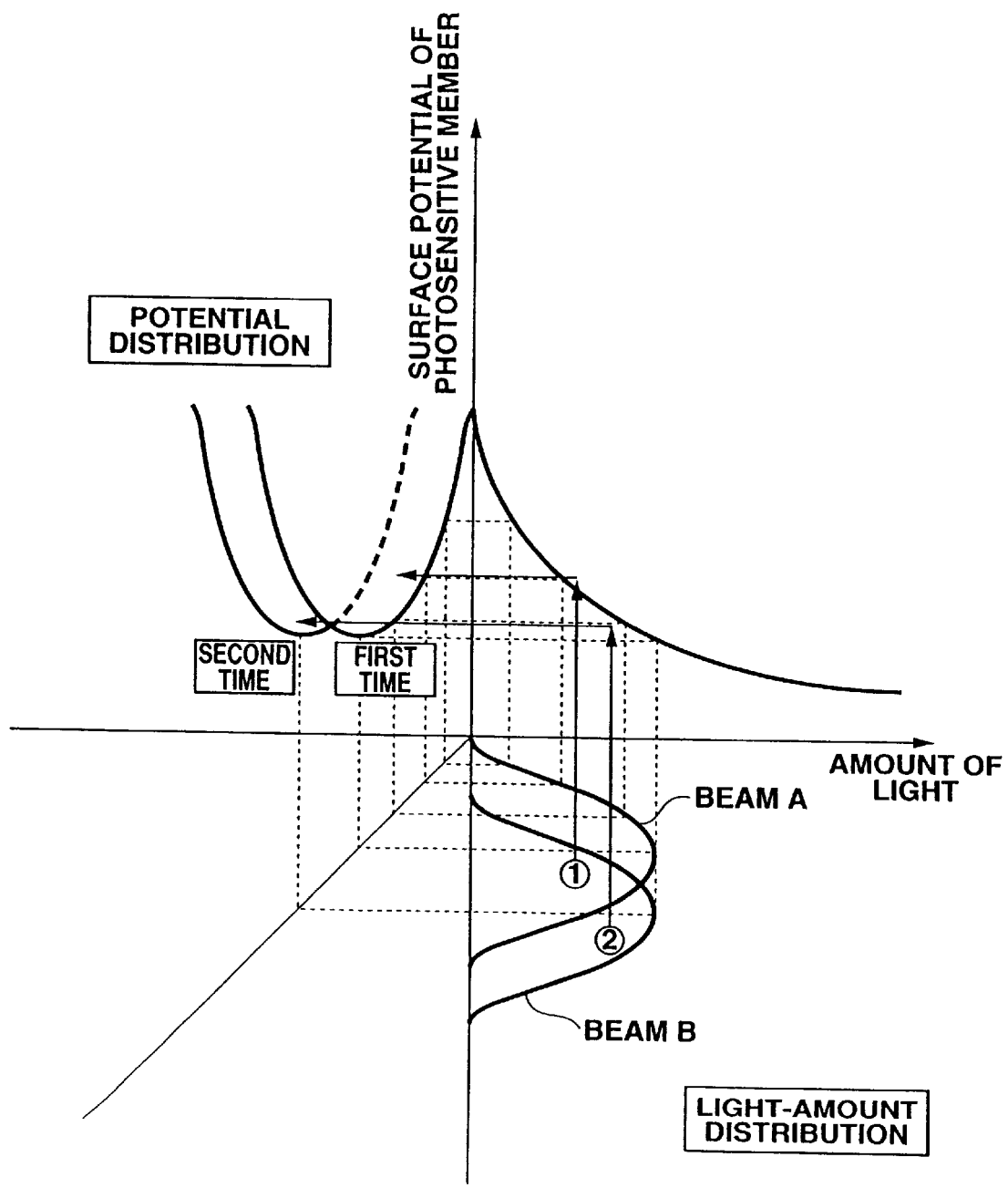
FIG. 21 is a schematic graph illustrating a potential-distribution when performing individual scanning by the beams A and B.
Figure 22:
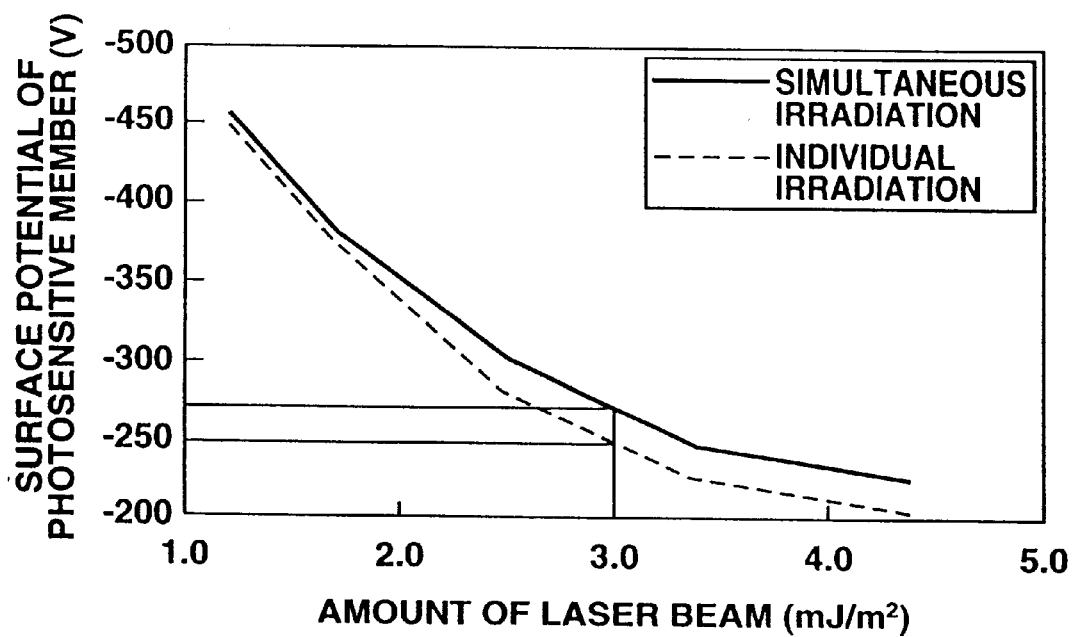
FIG. 22 is a diagram illustrating the surface potential of a photosensitive member when performing simultaneous irradiation and individual irradiation of the beams A and B by changing the amount of light.

FIG. 14 is a part of a schematic diagram in the case of two dots and two spaces when the beam B and the subsequent beam A are individually projected. The lines by the beams A and B are fully emitted with 8/8. In this case, since the beams A and B are individually emitted, the dot-position control circuit 32 is not operated, and fine dots are not added.

In the third embodiment, as in the first embodiment, in the case of multibeam irradiation, the problem that the potential at simultaneous exposure of a pair of beams is higher than the potential at individual exposure, resulting in a lower sensitivity, can be solved by providing the same potential as in the case of individual exposure by adding fine dots at the next pair of scanning lines. Since the potential is the same, the same density can be obtained.

Problems in the obtained image, such as trailing of edges, and the like, caused by addition of fine dots were not observed. The size of one pixel with the resolution of 1,200 dpi is 21 μm, and the size of the fine dot shown in FIG. 13 is 2.5 μm. Since the spot diameter in the main scanning direction is 70 μm, 2.5 μm is sufficiently smaller than the spot diameter. Accordingly, a trailed image is not obtained in consideration of overlap of latent images. When the latent image was actually developed with a toner having a particle diameter of 7 μm, an image having trailed lines was not obtained.

In the foregoing first through third embodiments, the case of a halftone image with two dots and two spaces has been illustrated. However, the present invention proposes methods of adding fine dots on a preceding or succeeding line at simultaneous exposure or individual exposure in multilaser irradiation, and is therefore not limited to the case of two dots. Another example of a halftone image is shown in Table 3.

Two combinations of dots are present for a pair of beams. In Example 1, dots are provided by emission of the beam A at the first scanning operation. In Example 2, dots are provided by non-emission of the beam A at the first scanning operation. (1), (2) and (3) represents the first scanning operation, the second scanning operation and the third scanning operation, respectively. In (OFF), fine dots are provided only when a space is present for one line.

In a pair of beams, the position to start writing of a halftone image sometimes shifts. Two types of halftone images are present depending on the starting position. Example 1 represents a case in which an image starts from the beam A, and Example 2 represents a case in which an image starts from the beam B while the beam A is in an off-state. One dot is fully emitted only with the beam A or the beam B, providing the same potential.

According to the flowchart shown in FIG. 2, when the beams A and B are simultaneously emitted at one scanning operation, in Examples 1 and 3, fine dots are emitted for the beam A at the next scanning operation. In Example 2, fine dots are emitted for the beam B on the preceding line of lines of simultaneous irradiation.

TABLE 1

|  |  |  | FIRST EMBODIMENT OR THIRD EMBODIMENT | | SECOND EMBODIMENT | |
|---|---|---|---|---|---|---|
|  |  |  | BEAM A | BEAM B | BEAM A | BEAM B |
| 1 DOT | EXAMPLE 1 | INDIVIDUAL | FULL EMISSION | OFF | FULL EMISSION | OFF |
|  | EXAMPLE 2 | INDIVIDUAL | OFF | FULL EMISSION | OFF | FULL EMISSION |
| 2 DOTS | EXAMPLE 1 | INDIVIDUAL (1) | (OFF) | OFF | OFF | FINE DOT |
|  |  | SIMULTANEOUS (2) | FULL EMISSION | FULL EMISSION | FULL EMISSION | FULL EMISSION |
|  |  | INDIVIDUAL (3) | FINE DOT | OFF | OFF | (OFF) |
|  | EXAMPLE 2 | INDIVIDUAL (1) | OFF | FULL EMISSION | OFF | FULL EMISSION |
|  |  | INDIVIDUAL (2) | FULL EMISSION | OFF | FULL EMISSION | OFF |
| 3 DOTS | EXAMPLE 1 | SIMULTANEOUS (1) | FULL EMISSION | FULL EMISSION | FULL EMISSION | FULL EMISSION |
|  |  | INDIVIDUAL (2) | FULL EMISSION | OFF | FULL EMISSION | OFF |
|  | EXAMPLE 2 | INDIVIDUAL (1) | OFF | FULL EMISSION | OFF | FULL EMISSION |
|  |  | SIMULTANEOUS (2) | FULL EMISSION | FULL EMISSION | FULL EMISSION | FULL EMISSION |

TABLE 1-continued

| 4 DOTS | EXAMPLE 1 | SIMULTANEOUS ① | (OFF) | OFF | OFF | FINE DOT |
|---|---|---|---|---|---|---|
| | | SIMULTANEOUS ② | FULL EMISSION → | FULL EMISSION | FULL EMISSION → | FULL EMISSION |
| | | SIMULTANEOUS ③ | FULL EMISSION → | FULL EMISSION | FULL EMISSION → | FULL EMISSION |
| | | INDIVIDUAL ④ | FINE DOT | OFF | OFF | (OFF) |
| | EXAMPLE 2 | INDIVIDUAL ① | OFF | FULL EMISSION | OFF | FULL EMISSION |
| | | SIMULTANEOUS ② | FULL EMISSION → | FULL EMISSION | FULL EMISSION → | FULL EMISSION |
| | | SIMULTANEOUS ③ | FULL EMISSION | OFF | FULL EMISSION | OFF |

In Table 3, the arrangement of beams on the photosensitive member is indicated by arrows. (1), (2) and (3) indicate the order of scanning operations. For example, in Example 1 with two dots in the first or third embodiment, arrows are present in the line of simultaneous (2) indicating simultaneous scanning, and in the line of individual (3) indicating individual scanning of subsequent fine dots, indicating the arrangement of "full emission of the beam A"→ "full emission of the beam B"→ "fine dots with the beam A"→ "the beam B OFF". In the first and third embodiments, Example 2 with two dots has the same potential as in Example 1.

Similarly, in Example 1 with two dots in the second embodiment, arrows are present in the line of individual (1) indicating individual scanning of fine dots, and in the line of simultaneous (2) indicating simultaneous emission, indicating the arrangement of "fine dots with the beam B"→ "full emission of the beam A"→ "full emission of the beam B"→ "the beam A OFF". In (OFF), repetition is replaced by fine dots only when a space is for one line.

From this Table 3, it can be understood that three dots are obtained by combining one dot and two dots, and four dots are obtained by combining two dots and two dots. Dots combining more than four dots are also obtained by combinations of one dot and two dots. Accordingly, no matter what halftone image is used, the potential can be equalized even if the writing position shifts, according to the methods of the various described embodiments.

Although in the foregoing embodiments, the case of forming a latent image on a photosensitive member using two laser beams performing simultaneous scanning has been illustrated, the present invention is not limited to a particular number of laser beams, but may also be applied to an image forming apparatus using a larger number of laser beams, such as four laser beams, eight laser beams, or the like (or, for that matter, an odd number). When using laser beams exceeding two laser beams, exposure of fine dots by another laser beam performing simultaneous scanning may be added if there is a portion of partially overlapped exposure by laser beams more than two laser beams performing simultaneous scanning.

As described above, according to the present invention, even when using multiple beams, the halftone density is stabilized irrespective of a timing of writing in scanning lines.

The individual components shown in outline or designated by blocks in the drawings are all well known in the image forming apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus for forming an image by exposing a photosensitive member by causing a plurality of laser beams to perform simultaneous scanning, said apparatus comprising:

first determination means for determining whether or not a portion exposed by adjacent laser beams simultaneously and with partial superposing, is present;

second determination means for determining whether or not a portion adjacent to the exposed portion and not exposed by a laser beam is present, if a result of determination by said first determination means is affirmative; and control means for adding exposure by fine dots to the unexposed portion, if a result of determination in said second determination means is affirmative.

2. An image forming apparatus for forming an image by exposing a photosensitive member by causing a plurality of laser beams to perform simultaneous scanning, said apparatus comprising:

first determination means for determining whether or not a first portion, exposed by adjacent laser beams simultaneously and with partial superposing, and a second portion, exposed by adjacent laser beams sequentially and with partial superposing, are present;

second determination means for determining whether or not a third portion adjacent to the first portion and not exposed by a laser beam, is present, if a result of determination by said first determination means is affirmative; and control means for adding exposure by fine dots to the unexposed portion, if a result of determination by said second determination means is affirmative.

3. An image forming apparatus comprising:

latent-image forming means for forming a latent image by exposing a photosensitive member by performing simultaneous scanning with at least two laser beams in a main scanning direction; and a controller, wherein, when the photosensitive member is exposed by the two laser beams at one scanning operation in the main scanning direction with partial superposing, said controller causes said latent-image forming means to add exposure by fine dots at an immediately preceding or immediately succeeding scanning operation with respect to the one scanning operation in the main scanning direction.

4. An image forming apparatus comprising:

latent-image forming means for forming a latent image by exposing a photosensitive member by performing simultaneous scanning with two laser beams; and a controller, wherein, when the two laser beams perform simultaneous emission at one scanning operation in a main scanning direction, said controller causes said latent-image forming means to add exposure by fine dots at an immediately preceding or immediately succeeding scanning operation with respect to the one scanning operation in the main scanning direction, and, when one of the two laser beams performing emission at the one scanning operation in the main scanning direction and one of the two laser beams performing emission at an immediately succeeding scanning operation in the main scanning direction are adjacent to each other, said controller causes said latent-image forming means not to add exposure by fine dots.

5. An image forming apparatus according to claim 3, wherein each of the fine dots comprises one dot whose size is 1/4 of one pixel or two dots whose size is 1/8 of one pixel present in a space of one pixel.

6. An image forming method in an image forming apparatus for forming an image by exposing a photosensitive member by causing a plurality of laser beams to perform simultaneous scanning, said method comprising:

a step A, of determining whether or not a portion exposed by adjacent laser beams simultaneously and with partial superposing, is present;

a step B, of determining whether or not a portion adjacent to the exposed portion and not exposed by a laser beam is present, if a result of determination in said step A is affirmative; and a step C, of adding exposure by fine dots to the unexposed portion, if a result of determination in said step B is affirmative.

7. An image forming method in an image forming apparatus for forming an image by exposing a photosensitive member by causing a plurality of laser beams to perform simultaneous scanning, said method comprising:

a step A, of determining whether or not a first portion, exposed by adjacent laser beams simultaneously and with partial superposing, and a second portion, exposed by adjacent laser beams sequentially and with partial superposing, are present;

a step B, of determining whether or not a third portion, adjacent to the first portion and not exposed by a laser beam, is present, if a result of determination in said step A is affirmative; and a step, C of adding exposure by fine dots to the unexposed portion, if a result of determination in said step B is affirmative.

* * * * *